United States Patent
Elledge

[11] 3,897,711
[45] Aug. 5, 1975

[54] MUSIC TRAINING DEVICE

[76] Inventor: Harvey Brewster Elledge, P.O. Box 95, Stonewall, N.C. 28583

[22] Filed: Feb. 20, 1974

[21] Appl. No.: 444,135

[52] U.S. Cl.................................. 84/479; 35/6
[51] Int. Cl.² ............... G09B 15/02; G09B 15/08; G09B 13/02
[58] Field of Search .......... 84/1.16, 1.17, 267, 293, 84/314–317, 464, 470, 476–479, DIG. 30; 35/5, 6; 46/226, 227

[56] References Cited
UNITED STATES PATENTS

| | | | |
|---|---|---|---|
| 1,324,274 | 12/1919 | Schantz............................ | 84/477 R |
| 1,324,275 | 12/1919 | Schantz............................ | 84/477 R |
| 1,750,988 | 3/1930 | Bostelmann Jr. ..................... | 84/478 |
| 1,840,903 | 1/1932 | Hurst................................. | 84/477 R |
| 3,080,661 | 3/1963 | Conrath.................................. | 35/6 |
| 3,395,461 | 8/1968 | Krause................................ | 84/478 |
| 3,612,676 | 10/1971 | Ooba et al. ........................ | 35/6 X |
| 3,695,138 | 10/1972 | Andersen............................. | 84/470 |
| 3,709,085 | 1/1973 | Del Castillo ..................... | 84/478 X |
| 3,812,277 | 5/1974 | Swartzman................................ | 35/6 |
| 3,837,256 | 9/1974 | Gullickson........................... | 84/478 |

*Primary Examiner*—Joseph W. Hartary
*Assistant Examiner*—Stanley J. Witkowski
*Attorney, Agent, or Firm*—William T. Rifkin

[57] ABSTRACT

A music training device is disclosed. The device utilizes a hand-held fingerboard containing a plurality of push buttons at locations corresponding to frets on a fretted stringed instrument or chromatic fingering points on a nonfretted stringed instrument. The fingerboard is connected by a cable to a display means which includes lamps selectively illuminated by depressing the fingerboard buttons. Utilization of the music training device permits a student to observe his progress and skill without looking at the fingerboard.

1 Claim, 9 Drawing Figures

MUSIC TRAINING DEVICE

BACKGROUND OF THE INVENTION

This invention relates to the field of instruments for teaching music, and more specifically to the teaching of methods for playing stringed instruments. In general, music can be viewed as a storage retrieval system: storage being the various forms of written music, and retrieval the act of reading and performing music. The present invention is designed to permit a student to discover how the present-day music storage/retrieval system was evolved to thereby more quickly learn the presently used methods of writing and reading music.

A great number of techniques and learning aids have been developed over the years for use in teaching music and, in particular, for teaching music to students learning to play a stringed instrument. However, these prior techniques often have one or more of the following undesirable characteristics: the student does not remain physically and mentally involved, there is lack of reinforcement towards learning sequences, and excessive teacher intervention is required leading to negative responses and disappointment on the part of the student.

OBJECTS OF THE INVENTION

It is accordingly an object of the invention to provide a teaching method and apparatus to train the student in responding to musical material.

It is a further object of the present invention to provide a system and apparatus which keeps a student physically and mentally involved while using the method.

It is a further object of the present invention to provide a teaching apparatus which is capable of reinforcing a learning sequence in either group or private use.

It is a further object of the present invention to impart an understanding of musical theory and its development in written form so that a student may begin to understand and be capable of problem solving.

It is yet another object of the present invention to provide an apparatus which eliminates the need for constant supervision and criticism by an instructor to thereby avoid the negative learning response incident thereto.

It is a further object of the present invention to provide a device for teaching students to play guitar, bass viol, cello, viola, as well as other stringed instruments.

Other objects and advantages of the invention will become apparent from the concluding portion of this specification.

DETAILED DESCRIPTION

In order to understand the advantages of the present invention, one must know that with the development of keyboard instruments early in the 10th century there developed a convention of writing music upside down on five lines and four spaces for the benefit of keyboard players. This system, attributed to the Italians, while a clever mathematical shorthand, is a graphic distortion of musical theory.

This distortion constitutes a serious stumbling block to the task of setting up a logical system of instruction for teaching music to a student. It is therefore necessary to make a student first understand the illogic of the system before he can understand and utilize it in an efficient manner. For example, "ti" must be written above "do" in the initial presentation to a student.

Figure 1:
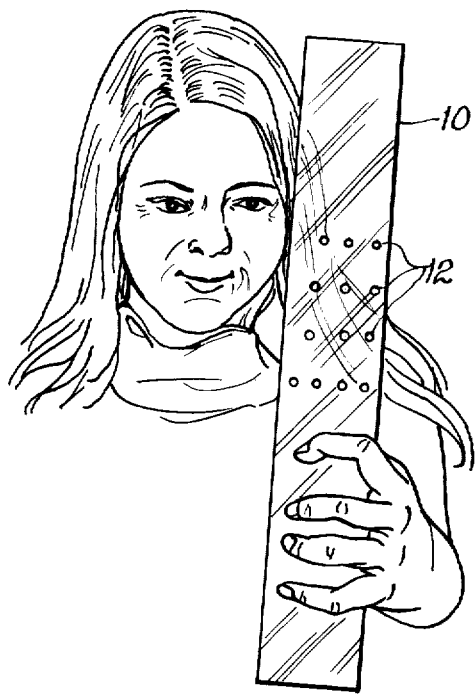
FIG. 1 is a view of a student utilizing a see-through fingerboard according to the present invention.
Figure 2:
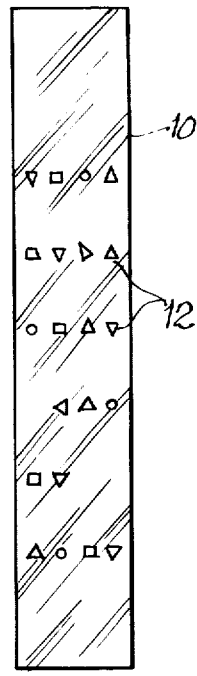
FIG. 2 is a front view of the see-through fingerboard illustrating the symbols positioned at locations corresponding to specific fingering patterns on a stringed instrument.

Referring now to FIGS. 1 and 2, there is illustrated a student employing a teaching aid according to one aspect of the invention for the purpose of familiarizing herself with the patterns required for a stringed instrument. The device is a see-through fingerboard 10 made of clear plastic and has symbols 12 located thereon. By means of this tool the student is shown a graphic representation of the full chromatic scale, sol to sol, for guitar, bass, cello and viola. The symbols 12 are at various locations corresponding to frets on an instrument board. While it is possible to use any set of symbols for the purposes of explaining the present invention, a modification of the traditional English church shape note symbols will be used. One modification of the English church shape note symbols is a "dog bone" figure, utilized to indicate chromatic points on the scale.

A student utilizing the see-through fingerboard 10 soon learns that when changing from one string to another, i.e., when shifting from one vertical row of symbols to another vertical row of symbols, a given note may be duplicated on two different strings by an upward or downward shift. Such shifts and extensions can be demonstrated for the chromatic scale, for secondary dominant and for chromatic passing tones. Further, the student is taught that the shifts and extensions are common to all stringed instruments, although the pivot fingers and sequential movements must be adapted to the particular size and type of instrument.

After the student has become familiar with the fingerboard arrangement and shifting patterns, short chaining exercises are employed to permit the student to gain facility in melodic and chord arpeggio chaining.

Figure 3:
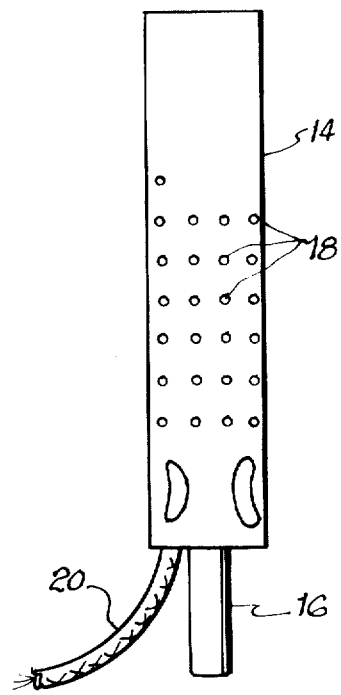
FIG. 3 is a front view of a hand-held fingerboard utilizing push buttons at the fingering locations.

Referring now to FIG. 3, a hand-held fingerboard 14 similar in arrangement to the see-through fingerboard 10 is shown. The fingerboard is attached to a handle 16 and has a plurality of push-button switches 18 mounted thereon in an arrangement corresponding to the arrangement of symbols 12 on the see-through fingerboard 10. Each push-button switch is wired in a manner hereafter described such that depressing the switch completes the circuit to a display means. A cable 20 is used for carrying the wires attached to the switches 18 to the display means. The cable 20 preferably terminates in a male plug adapted to engage a female receptacle on the display means.

Figure 4:
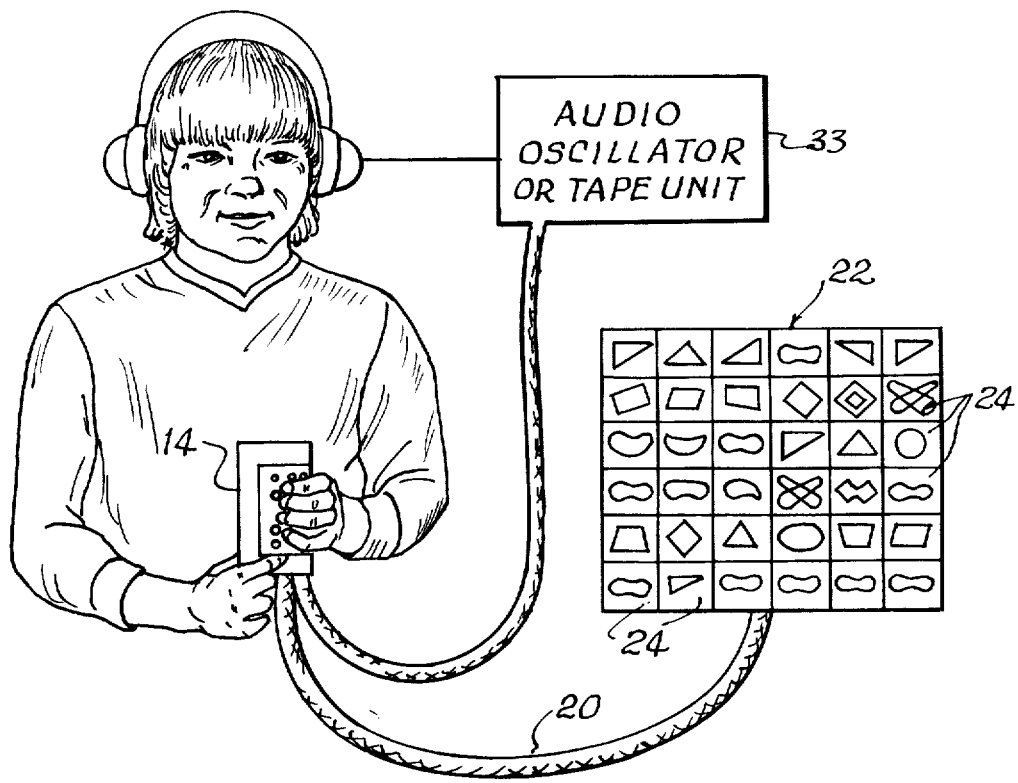
FIG. 4 illustrates a student utilizing the push-button fingerboard connected to a visual display means, and additionally utilizing an audio reinforcement device.

Referring to FIG. 4, a student holding a push-button fingerboard 14 is illustrated. The fingerboard has been connected to a visual response board 22. The switches on the fingerboard are wired to the visual response board so as to correspond with the finger positions on a guitar or other stringed instrument. In this way, a student may practice on the fingerboard 14 and observe the accuracy of his exercise on the response board 22.

The response board 22, as will be described, has a plurality of indicator means which may be small lamps in each of a plurality of square compartments 24. Disposed in front of the lamps is a symbol corresponding to the particular position on the fingerboard. The symbol is painted, printed or otherwise placed on a thin transparent piece of plastic such that when a lamp behind the symbol is lit, the symbol itself will be illuminated so as to visually display the particular symbol corresponding to the push button depressed by the student.

As shown in FIG. 4, the student holds the fingerboard 14 with the push buttons facing away from him so as to simulate playing a stringed instrument. The lamp indicators on the response board shows the student his finger movement without the necessity of him looking at his fingers on the fingerboard. Displaying the exercises on the response board, in a rational preselected pattern, reinforces the chaining of patterns and permits the immediate detection and remedy of wrong responses. Further, this correcting function is performed without verbal interference by the teacher, thereby tending to reduce the negative attitude and tension which builds up during such a session.

The arrangement of the visual response board 22 may be as desired by the particular instructor simply by rearranging the symbols to suit his particular purpose. As an example, the symbols may be arranged to display movable "do" symbols which correspond to the positions on a guitar. In this way the student chains and learns the proper hand movements including correct arm, wrist and finger positions without looking at his fingers.

An audio oscillator or tape unit 33 permits the melodic patterns produced by a student to be heard as well as seen, and is accomplished by patching the hand-held fingerboard into a multi-toned audio oscillator and then to a pair of earphones which the student wears. Alternatively, instead of an audio oscillator, a programmed tape unit having a prerecorded sequence whereon can be operated when the correct push button is actuated. Failure to press the correct button would cause a bleeping signal, thereby providing supervised practice.

Figure 5:
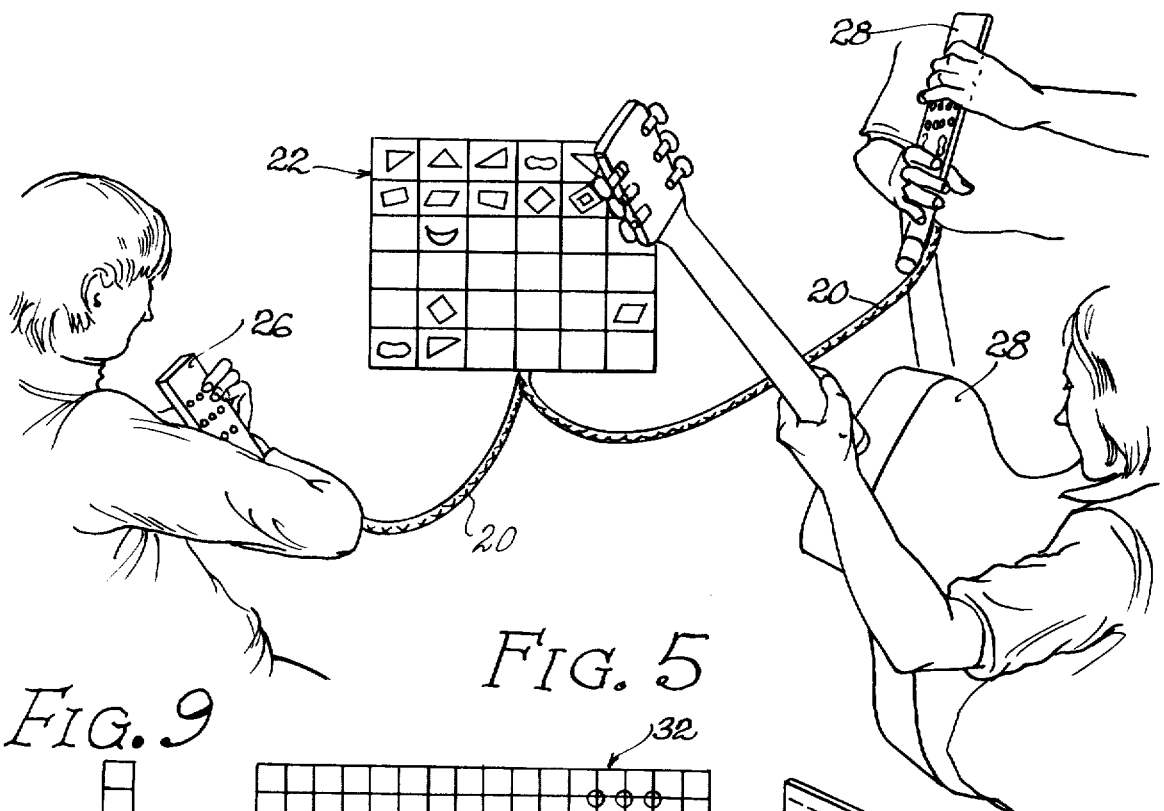
FIG. 5 illustrates the flexibility of the present invention for use in several types of training applications.

Referring to FIG. 5, the versatility of the invention is indicated. The visual response board 22 is operated by either of finger response boards 26 or 28. Both boards 26 and 28 are connected to the response board by cables 20 and employ a junction type adapter for this purpose. When the board is connected to dual control means, it may be employed by two students who may alternately light the display in a follow-the-leader type of practice or who may challenge each other as to their current level of skill. Further, the dual control mode permits an instructor to display a particular exercise pattern on the response board which can then be immediately attempted by the student. Also, a student can play a stringed instrument such as a guitar 28, following the patterns illustrated on the response board by the teacher so that the student who is attempting to follow the patterns on the fingerboard 26 receives both visual and audio reinforcement of the desired pattern. The follow-the-leader type games which may be played between students or with the instructor encourage learning and have the additional benefit of helping to identify students who require special help.

Figure 9:
FIGS. 6 and 9 illustrate two useful configurations of the visual display means.
Figure 6:
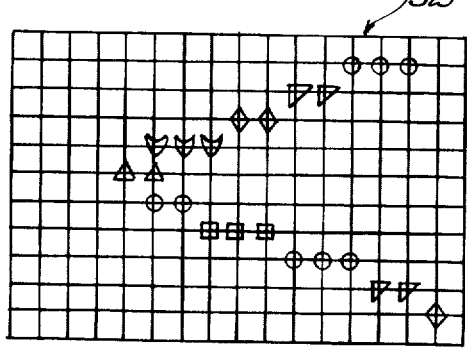

Referring now to FIGS. 6 and 9, two of many possible variations of the response board are shown. Board 30 has 18 transparent display areas in a single vertical row. Each display area will have one symbol located thereon and a lamp positioned behind it connected to a female receptacle matching a connector from the cable 20. As with any of the display boards described in this application, the lamps may be 6 or 12 volt D.C. supplied by a transformer from a standard 120 volt A.C. outlet. Alternatively, where the device is to be used outdoors, as for example, a teaching adjunct to a marching band practice, a portable D.C. power source can be employed.

The particular arrangement of the board 30 is to indicate and reinforce a new student's understanding of the musical theory incorporated into the standard shorthand notation which is currently employed to write music. Use of the board gives the student an undistorted conception of the notes being played.

When the student is familiar with the board 30 and can play one or more exercises thereon, the board is turned upside down so as to invert the symbol display and the student is instructed to again play his exercises. After several cycles of the right side up and upside down performance, the student is asked to play a new and unknown exercise in the upside down mode. In this manner the student sees "ti" falling below "do" and has implicitly learned to read upside down. The problem overcome by this technique may be likened to teaching an automobile driver to steer in reverse. When the student has mastered this upside down-right side up technique so that he can play in either mode, he has achieved an important goal in rationalizing the present-day system of writing music with the inherent distortions contained therein.

Referring now to display board 32, there is shown a rectangular visual display board having symbols mounted on the board to form a V laying on its right side. A student operating a fingerboard connected to the board 32 can begin to understand the graphic distortion between the chromatic and diatonic scales. Exercises learned on the board 30 may be played simply by assigning the "do" value to one of the movable symbols. He can then play a known exercise in any key.

An easily provided variation of the fingerboard units illustrated in FIGS. 3, 4 and 5 is a wireless remote fingerboard which eliminates the need for a long cord tied to the display board. Well known multiplexing techniques can be used for signalling via a transmitter contained in the fingerboard and a received at the display board. Such a transmitter/receiver arrangement may be tied in with an audio oscillator or tape unit as previously discussed.

Figure 7:
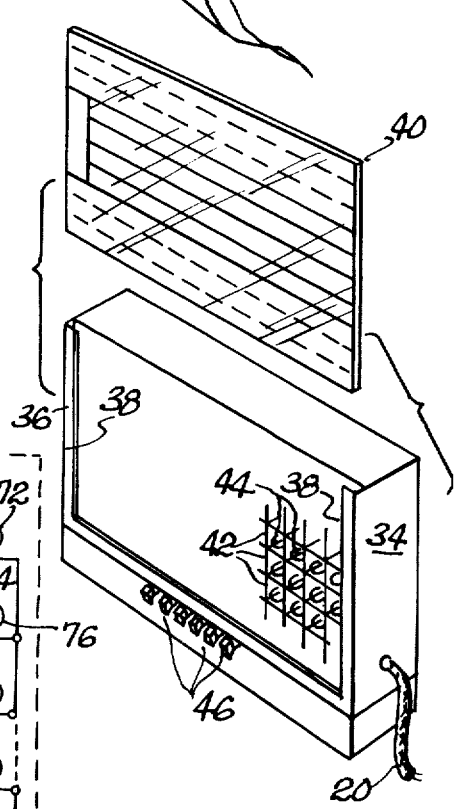
FIG. 7 is a perspective view illustrating the construction details of the visual display board.

Referring now to FIG. 7, a preferred construction of the visual display board is illustrated. The board comprises a pair of end panels 34 and 36 having a pair of rails 38 at the front thereof for retaining a transparent front panel 40 thereon. Provided inside the visual display is a lattice-like structure of partitioned cubicles 42. Each cubicle contains a small electric lamp 44 and serves to isolate each lamp from the adjoining cubicles. The cubicles 42 are open at the front so that when a lamp is turned on it will provide light through the front panel 40.

The front panel 40 is adapted to receive various arrangements of symbols thereon which are positioned over predetermined cubicles according to the particular scale pattern to be taught. Thus, when a lamp is illuminated by the student it will back light a symbol located on the plastic sheet directly in front of the cubicle. The lamps are supplied by a 6 or 12 volt D.C. source, not shown, and the arrangement displayed may be altered as desired to provide for sharp or flat chromatic scales. A plurality of switches 46 are mounted on the front panel for selecting the desired chromatic scale.

Figure 8:
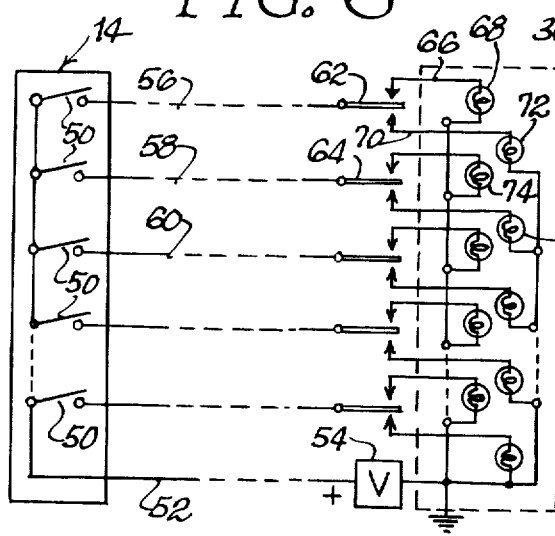
FIG. 8 is a simplified schematic of a wiring arrangement for the push-button fingerboard and the visual display board system.

Referring now to FIG. 8, a wiring diagram for the visual display board is shown. It will be apparent that a greater or smaller number of switches and lamps can be provided as required for a particular application. The hand-held fingerboard 14 has a plurality of normally open, make or break switches 50 connected by a line 52 to the positive terminal of D.C. voltage source 54. When depressed, each switch completes a circuit, via a selected one of cable lines 56, 58 or 60 to one of the display board lamps.

In the case of lines which correspond to chromatic scale positions that must be changed, as for example lines 56 and 58, the particular lamp illuminated by the switches 50 depends upon the position of the selector switches 62 and 64. These switches are provided at the visual display board and permit the selection of sharp or flat chromatic scales for display. Assuming switch 62 is connected to line 66, closing switch 50 on line 56 will complete a circuit lighting lamp 68. Alternately, if switch 62 is connected to line 70, closing switch 50 on line 56 will light lamp 72. Similarly, switch 50 on line 58 will light either lamp 74 or 76 depending upon the position of chromatic selector switch 64.

While I have shown and described an embodiment of this invention in some detail, it will be understood that this description and illustration are offered merely by way of example, and that the invention is to be limited in scope only by the appended claims.

I claim:

1. A stimulus-response training device for music students, comprising:
 a visual display board having a plurality of discrete indicator lamps thereon;
 at least two control means remote from said display board each including a stringless hand-held fingerboard having a plurality of electrical push-button switches thereon for selectively activating individual lamps; and
 electrical cable means for connecting said control means to said display board whereby at least one student can sequentially duplicate a visual pattern displayed on said display board by an instructor.

* * * * *